Dec. 12, 1961    M. E. BOURNS    3,013,235
PRESSURE RESPONSIVE ELECTRICAL INSTRUMENTS
Original Filed June 14, 1956
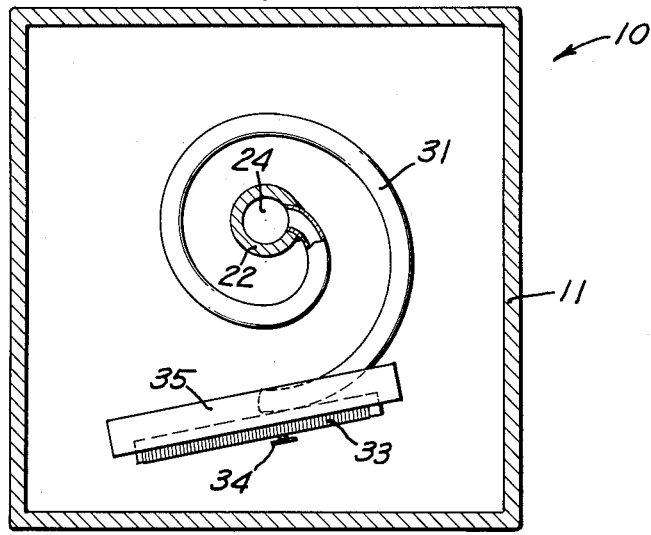
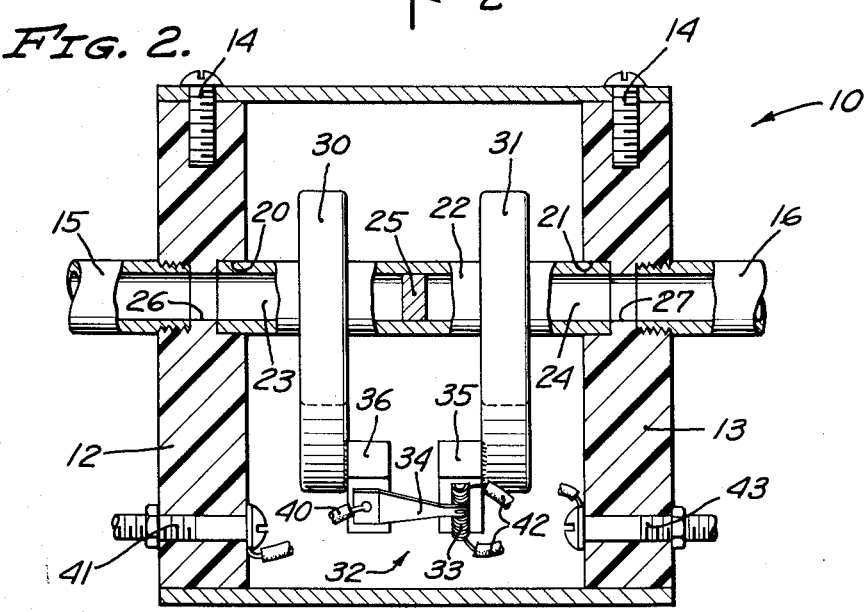
INVENTOR.
MARLAN E. BOURNS
BY
Herbert E. Kidder
AGENT United States Patent Office 3,013,235
Patented Dec. 12, 1961

3,013,235
PRESSURE RESPONSIVE ELECTRICAL INSTRUMENTS
Marlan E. Bourns, 2482 Carlton Place, Riverside, Calif.
Continuation of application Ser. No. 591,370, June 14, 1956. This application Apr. 11, 1960, Ser. No. 21,553
3 Claims. (Cl. 338—40)

The present invention relates to pressure responsive electrical instruments, and is a continuation of my pending application, Serial No. 591,370, filed June 14, 1956, now Patent No. 2,932,807, entitled Pressure Responsive Electrical Instruments.

More specifically, the present invention relates to differential pressure transducers of the type embodying an electrical signal means, such as a variable resistor or potentiometer, for measuring fluid pressure against either a vacuum, atmospheric pressure, or a second fluid pressure as the reference.

The primary object of the present invention is to provide a sensitive pressure transducer which is relatively immune to the effects of shock, vibration, and acceleration. This is an important advantage, inasmuch as pressure transducers of this type are frequently exposed to severe conditions of vibration and acceleration, while being called upon to deliver accurate pressure response, free of vibration and acceleration error.

Another object of the invention is to provide a pressure transducer of the type described, wherein the electrical output is not affected by temperature changes.

Still a further object of the invention is to provide a differential pressure responsive instrument which is simple and inexpensive to manufacture, while at the same time rugged in construction and having an extremely sensitive and accurate response to fluid pressure conditions.

These objects are achieved by using a pair of spirally coiled bourdon tubes which are arranged side by side within a housing, the said bourdon tubes being attached at their inner ends to axially aligned pressure fluid conduits. Secured to the movable outer ends of the bourdon tubes are two cooperating electrical parts which provide an output signal that is a function of the relative positions of the parts with respect to one another, and this output signal can be utilized to indicate the fluid pressure conditions being monitored. The two bourdon tubes are of substantially the same configuration and have substantially the same spring constant, and therefore are relatively unaffected by vibration and acceleration forces, or by the effects of temperature changes.

The foregoing and other objects and advantages of the present invention will become apparent to those skilled in the art upon consideration of the following detailed description of the preferred embodiment thereof, reference being had to the accompanying drawings wherein:

FIGURE 1 is a sectional view through a pressure transducer embodying the principles of the invention; and FIGURE 2 is another sectional view through the same, taken at 2—2 in FIGURE 1.

In the drawings, the pressure transducer is designated in its entirety by the reference numeral 10 and includes a housing consisting of a case 11 and spaced-apart ends 12 and 13. The ends 12, 13 are preferably of dielectric material, such as ceramic or plastic, and the case 11 extends over the edges thereof and is secured thereto by screws 14. Two threaded pipes 15 and 16 are screwed into tapped holes in the ends 12 and 13, respectively, and these pipes are connected to sources of fluid pressure (not shown).

Mounted at its ends in aligned holes 20, 21 in the ends 12, 13, respectively, and extending centrally through the interior of the housing, is a hollow tube 22, which is divided internally into two conduit portions 23 and 24 by a plug 25. Conduit portion 23 is connected by a passageway 26 with the interior of pipe 15, while conduit portion 24 is connected by a passageway 27 with the interior of pipe 16.

Disposed side by side within the housing and parallel to one another are two spiral bourdon tubes 30 and 31, which are coiled around the tube 22. The inner ends of the bourdon tubes 30, 31, are fixedly joined to the tube 22, as shown in FIGURE 1, with the interior of the bourdon tubes opening into the respective conduit portion 23, 24. The outer ends of the bourdon tubes 30, 31 are plugged in the usual manner, and each of these outer ends is movable within the plane of the helix responsive to any change in the pressure differential between the inside and outside of the bourdon tube. Electrical signal means 32 is operatively associated with the movable ends of the two bourdon tubes, and such signal means may take any desired form. In the embodiment illustrated herein, the electrical signal means 32 comprises a variable resistor, or potentiometer, consisting of a resistance element 33 and a resilient spring contact finger 34. The resistance element 33 is of the elongated linear type, which may be either of the wire-wound variety, as shown in the drawings, or of conductive composition. The element 33 is mounted on a supporting block 35 which is attached to the movable end of the bourdon tube 31, and is disposed with its lengthwise dimension or longitudinal axis, generally parallel to the line of travel of the free end of the bourdon tube.

The resilient spring contact finger 34 may be formed of sheet metal to the configuration shown, and is attached at one end to a supporting block 36, which is fixed to the movable end of bourdon tube 30. The contact finger 34 projects laterally from the supporting bar 36 and overlies the resistance element 33, which it engages with light spring pressure. The contact member 34 is connected by a wire 40 to a terminal post 41 on the end member 12. The resistance element 33 has its opposite ends connected by wires 42 to two terminal posts 43, only one of which is shown in the drawings. The terminal posts 41, 43 may be connected into suitable electrical circuits, and the output signal of the electrical signal means 32 can be utilized to determine the fluid pressures being monitored.

Preferably, the two bourdon tubes 30 and 31 are of substantially identical configuration, with substantially the same spring constant. Thus, the free ends of the bourdon tubes move in unison when the instrument is subjected to vibration or acceleration, and the contact member 34 and resistance element 33 maintain the same relative positions at all times. Also, the two bourdon tubes react identically to any temperature change, and therefore there is no relative displacement of the contact 34 with respect to the resistance element 33 due to temperature affect.

The operation of the invention is believed to be clear from the foregoing description and the drawings. Pressure may be admitted to either of the two bourdon tubes 30, 31 througth the pipes 15, 16, respectively. The other tube may be evacuated to a vacuum, or opened to atmospheric pressure or filled with gas at any desired pressure, depending upon the reference pressure to be used. The transducer may also be used to measure the difference between two fluid pressures by introducing one of the pressures to one of the bourdon tubes and the other pressure to the other bourdon tube. Since the movement of the outer ends of the bourdon tubes is a function of the pressure differential between the inside and outside of the bourdon tubes, the difference between the fluid pressures will be reflected by a displacement of the contact member 34 along the length of the resistance element 33.

While I have shown and described in considerable detail what I believe to be the preferred form of my invention, it will be understood by those skilled in the art that various changes may be made in the shape and arrangement of the several parts without departing from the broad scope of the invention, as defined in the appended claims.

I claim:

1. A differential pressure transducer comprising a housing, a pair of aligned pressure fluid conduits projecting into said housing from opposite ends thereof, said conduits being connected to two separate sources of fluid media at different pressures, a pair of spiral bourdon tubes coiled around said conduits, the inner ends of said spiral bourdon tubes being fixed to and communicating with said pressure fluid conduits, respectively, the outer ends of said bourdon tubes being movable in parallel planes perpendicular to the longitudinal axis of said conduits, and electrical signal means consisting of a pair of relatively movable parts which cooperate to produce an electrical signal that is a function of the displacement of one of said parts with respect to the other due to the differential in fluid pressures within the said two bourdon tubes, one of said parts being mounted on the free end of one of said bourdon tubes, and the other of said parts being mounted on the free end of the other bourdon tube.

2. A pressure responsive instrument as defined in claim 1, wherein said bourdon tubes are substantially identical to one another in configuration and have the same spring constant.

3. A pressure responsive instrument as defined in claim 1, wherein said electrical signal means comprises a resistance element mounted on the free end of one of said bourdon tubes, and a contact member mounted on the free end of the other of said bourdon tubes, said contact wiping on said resistance element, and terminal means electrically connected to said resistance element and to said contact member.

References Cited in the file of this patent

UNITED STATES PATENTS

| | | |
|---|---|---|
| 1,729,178 | Motheral | Sept. 24, 1929 |
| 2,622,177 | Klose | Dec. 16, 1952 |
| 2,862,388 | Grant | Dec. 2, 1958 |